United States Patent
Hsu et al.

(10) Patent No.: US 8,459,114 B2
(45) Date of Patent: Jun. 11, 2013

(54) MULTI-AXIS CAPACITIVE ACCELEROMETER

(75) Inventors: Yu-Wen Hsu, Tainan (TW); Hsin-Tang Chien, Yilan County (TW); Sheah Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 955 days.

(21) Appl. No.: 12/550,394

(22) Filed: Aug. 30, 2009

(65) Prior Publication Data

US 2010/0058864 A1 Mar. 11, 2010

Related U.S. Application Data

(60) Provisional application No. 61/094,411, filed on Sep. 5, 2008.

(30) Foreign Application Priority Data

Sep. 5, 2008 (TW) ................................ 97134219 A

(51) Int. Cl.
*G01P 15/125* (2006.01)

(52) U.S. Cl.
USPC ....................................................... 73/514.32

(58) Field of Classification Search
USPC ........................ 73/514.32, 488, 493, 514.01
See application file for complete search history.

(56) References Cited

U.S. PATENT DOCUMENTS

| | | | | |
|---|---|---|---|---|
| 5,487,305 A * | 1/1996 | Ristic et al. | ................ | 73/514.32 |
| 5,537,083 A * | 7/1996 | Lin et al. | ....................... | 333/186 |
| 5,600,064 A * | 2/1997 | Ward | ......................... | 73/504.04 |
| 5,672,949 A * | 9/1997 | Ward | ............................. | 318/609 |
| 5,817,942 A * | 10/1998 | Greiff | ........................ | 73/514.01 |
| 5,945,599 A * | 8/1999 | Fujiyoshi et al. | .......... | 73/504.12 |
| 6,018,998 A * | 2/2000 | Zunino et al. | ............. | 73/514.16 |
| 6,041,653 A * | 3/2000 | Ichikawa et al. | .......... | 73/514.32 |
| 6,067,858 A * | 5/2000 | Clark et al. | ............... | 73/504.16 |
| 6,089,089 A * | 7/2000 | Hsu | ............................. | 73/504.12 |
| 6,149,190 A * | 11/2000 | Galvin et al. | ................ | 280/735 |
| 6,201,284 B1 * | 3/2001 | Hirata et al. | .................. | 257/415 |
| 6,223,598 B1 * | 5/2001 | Judy | .......................... | 73/514.32 |
| 6,230,563 B1 * | 5/2001 | Clark et al. | ............... | 73/504.04 |
| 6,250,156 B1 * | 6/2001 | Seshia et al. | .............. | 73/504.12 |
| 6,257,059 B1 * | 7/2001 | Weinberg et al. | .......... | 73/504.16 |
| 6,370,937 B2 * | 4/2002 | Hsu | .................. | 73/1.37 |
| 6,386,033 B1 * | 5/2002 | Negoro | ...................... | 73/504.12 |
| 6,578,420 B1 * | 6/2003 | Hsu | ............................. | 73/504.16 |
| 6,840,106 B1 | 1/2005 | McNeil | | |
| 6,845,670 B1 * | 1/2005 | McNeil et al. | ............. | 73/514.32 |

(Continued)

*Primary Examiner* — Peter Macchiarolo
*Assistant Examiner* — Samir M Shah
(74) *Attorney, Agent, or Firm* — Jianq Chyun IP Office

(57) ABSTRACT

A multi-axis capacitive accelerometer is disclosed. A first mass is disposed and held by an anchor supported by a substrate, wherein the first mass is asymmetrically suspended on the anchor by means of two cantilevers, so that the first mass rotates about a rotation axis, for sensing the acceleration in a first direction perpendicular to the substrate. A second mass is disposed in the first mass and suspended on the first mass by means of a set of springs to sense the acceleration in a second direction parallel to the substrate. Furthermore, a third mass can be disposed in the second mass, wherein the third mass is suspended on the second mass by means of another set of springs to sense the acceleration in a third direction. The first direction, the second direction and the third direction are mutually orthogonal to each other.

17 Claims, 5 Drawing Sheets

U.S. PATENT DOCUMENTS

| | | |
|---|---|---|
| 6,936,492 B2 | 8/2005 | McNeil et al. |
| 6,981,416 B2 * | 1/2006 | Chen et al. .................... 73/510 |
| 7,172,919 B2 * | 2/2007 | Weinberg et al. ............... 438/50 |
| 7,258,011 B2 * | 8/2007 | Nasiri et al. ............... 73/514.32 |
| 7,258,012 B2 | 8/2007 | Xie |
| 7,313,958 B2 * | 1/2008 | Willig et al. ............... 73/504.12 |
| 7,316,161 B2 * | 1/2008 | Willig et al. ............... 73/504.12 |
| 7,694,561 B2 * | 4/2010 | Steinlechner ............... 73/504.02 |
| 7,784,344 B2 * | 8/2010 | Pavelescu et al. ......... 73/514.32 |
| 7,796,872 B2 * | 9/2010 | Sachs et al. ..................... 396/55 |
| 7,849,742 B2 * | 12/2010 | Wang et al. ................ 73/514.32 |
| 7,907,838 B2 * | 3/2011 | Nasiri et al. ..................... 396/55 |
| 8,020,441 B2 * | 9/2011 | Seeger ....................... 73/504.12 |
| 8,205,498 B2 * | 6/2012 | Hsu et al. ................... 73/514.32 |
| 2001/0032508 A1 * | 10/2001 | Lemkin et al. ............. 73/514.32 |
| 2003/0066351 A1 * | 4/2003 | Weinberg et al. .......... 73/504.16 |
| 2004/0206176 A1 * | 10/2004 | Willig et al. ............... 73/504.12 |
| 2004/0211258 A1 * | 10/2004 | Geen ............................... 73/510 |
| 2005/0081631 A1 * | 4/2005 | Weinberg et al. .......... 73/504.16 |
| 2005/0217374 A1 * | 10/2005 | Chen et al. ................. 73/504.04 |
| 2007/0062283 A9 * | 3/2007 | Weinberg et al. .......... 73/504.16 |
| 2009/0139330 A1 * | 6/2009 | Pavelescu et al. .......... 73/514.32 |
| 2010/0236327 A1 * | 9/2010 | Mao .......................... 73/504.12 |

* cited by examiner

MULTI-AXIS CAPACITIVE ACCELEROMETER

CROSS-REFERENCE TO RELATED APPLICATION

This application claims the priority benefit of U.S.A. provisional application Ser. No. 61/094,411, filed on Sep. 5, 2008, all disclosures are incorporated therewith. This application also claims the priority of Taiwan application serial no. 97134219, filed on Sep. 5, 2008. The entirety of each of the above-mentioned patent applications is hereby incorporated by reference herein and made a part of this specification.

BACKGROUND

1. Technical Field

The disclosure relates to an accelerometer which is manufactured by Micro Electro Mechanical System (MEMS) technology and has the capability of sensing two axes or three axes acceleration.

2. Description of Related Art

Many non-military applications require accelerometer with the ability to sense acceleration along three mutually orthogonal axes. Especially for the applications in modern consumer electronic devices, the size and cost of a multi-axis accelerometer is demanded. The art for a compact accelerometer with a single sensing structure for sensing acceleration along three mutually orthogonal axes is thus needed.

U.S. Pat. No. 6,201,284 discloses an accelerometer which utilizes one single sensing structure with proof masses to detect the acceleration of X, Y and Z axes. The proof masses detecting X-axis and Y-axis accelerations may be interfered by the motion of Z-axis proof mass. The design likes this will cause cross-axis sensitivities poor. U.S. Pat. No. 6,845,670 discloses a three-axis accelerometer with only one proof mass, however, this accelerometer adopts a set of non decoupled springs for detecting the acceleration of three axes. This may affect the performance of cross-axis sensitivity seriously. In addition, the motion of the proof mass for sensing Z-axis acceleration disclosed by U.S. Pat. No. 6,845,670 may be a combination of rotation and movement, and this may results in poor linearity of the accelerometer.

U.S. Pat. No. 7,258,012 which disclosed another accelerometer design with one sensing structure, but the motion of its Z-axis proof mass also may lead the Z-axis output with poor linearity.

SUMMARY

Accordingly, the disclosure is directed to a multi-axis capacitive accelerometer with a smaller size and excellent performances including high sensitivity, high linearity and low cross-axis sensitivity.

The disclosure provides a multi-axis capacitive accelerometer, which includes a substrate and an element structure layer. The element structure layer comprises a plurality of anchors, a plurality of sets of spring structures, a plurality of comb-shaped capacitor structures, a first mass and a second mass. The first mass is asymmetrically suspended on one of the above-mentioned anchors by means of two cantilevers and the anchors are fixed on the substrate. The first mass has a rotation axis along a first direction, wherein the rotation axis is implemented by the above-mentioned two cantilevers to make the mass of the first mass asymmetrically distributed on a second direction. When the first mass is exerted by a force in a third direction, the first mass would rotate about the rotation axis. The first direction, the second direction and the third direction are mutually orthogonal to each other. The second mass is suspended on the first mass by means of one of the above-mentioned sets of spring structures, and the second mass can sense the acceleration in the first direction or in the second direction so as to move correspondingly in the first direction or in the second direction.

The disclosure also provides another multi-axis capacitive accelerometer, which includes a substrate and an element structure layer. The element structure layer comprises a plurality of anchors, a plurality of sets of spring structures, a plurality of comb-shaped capacitor structures, a first mass, a second mass and a third mass. The most of the layouts and the relations thereof are the same as above described except that the element structure layer has a third mass, wherein the third mass is suspended on the second mass by means of a set of springs, and the third mass can move in a direction perpendicular to the direction which the movement direction of the second mass is on.

In the disclosure, since each of the different masses has an independent spring structure of their own, so that the disclosure can reduce the interference caused by the cross-axis sensitivity and effectively increase the linearity of the multi-axis capacitive accelerometer. In addition, since both the second mass and the third mass are disposed on the first mass, the disclosure can also effectively reduce the structure dimension of the multi-axis capacitive accelerometer.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
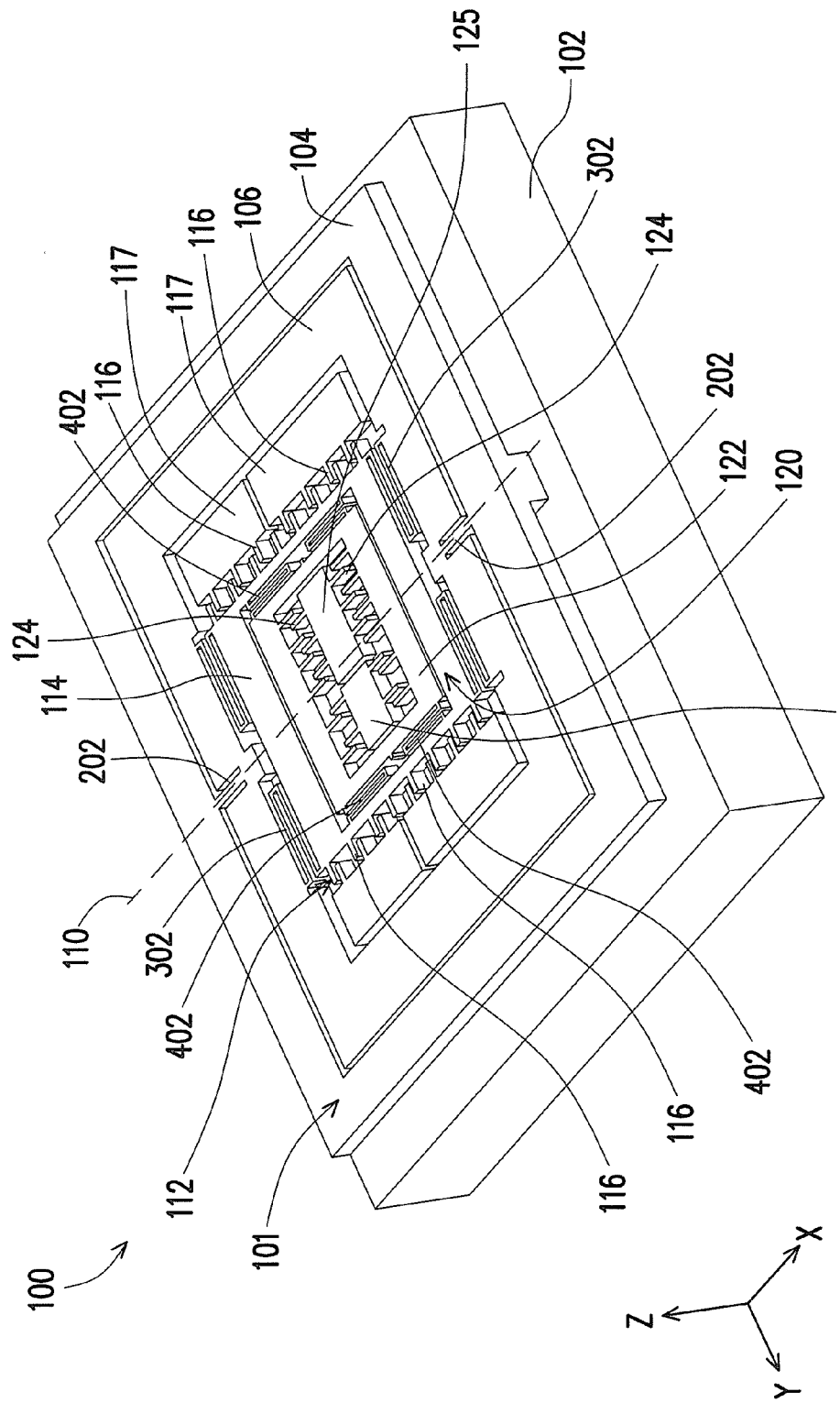
FIG. 1A is a 3-dimensions diagram of a multi-axis capacitive accelerometer according to an embodiment of the disclosure.

Reference will now be made in detail to the embodiments of the disclosure, examples of which are illustrated in the accompanying drawings. Wherever possible, the same reference numbers are used in the drawings and the description to refer to the same or like parts.

Figure 1B:
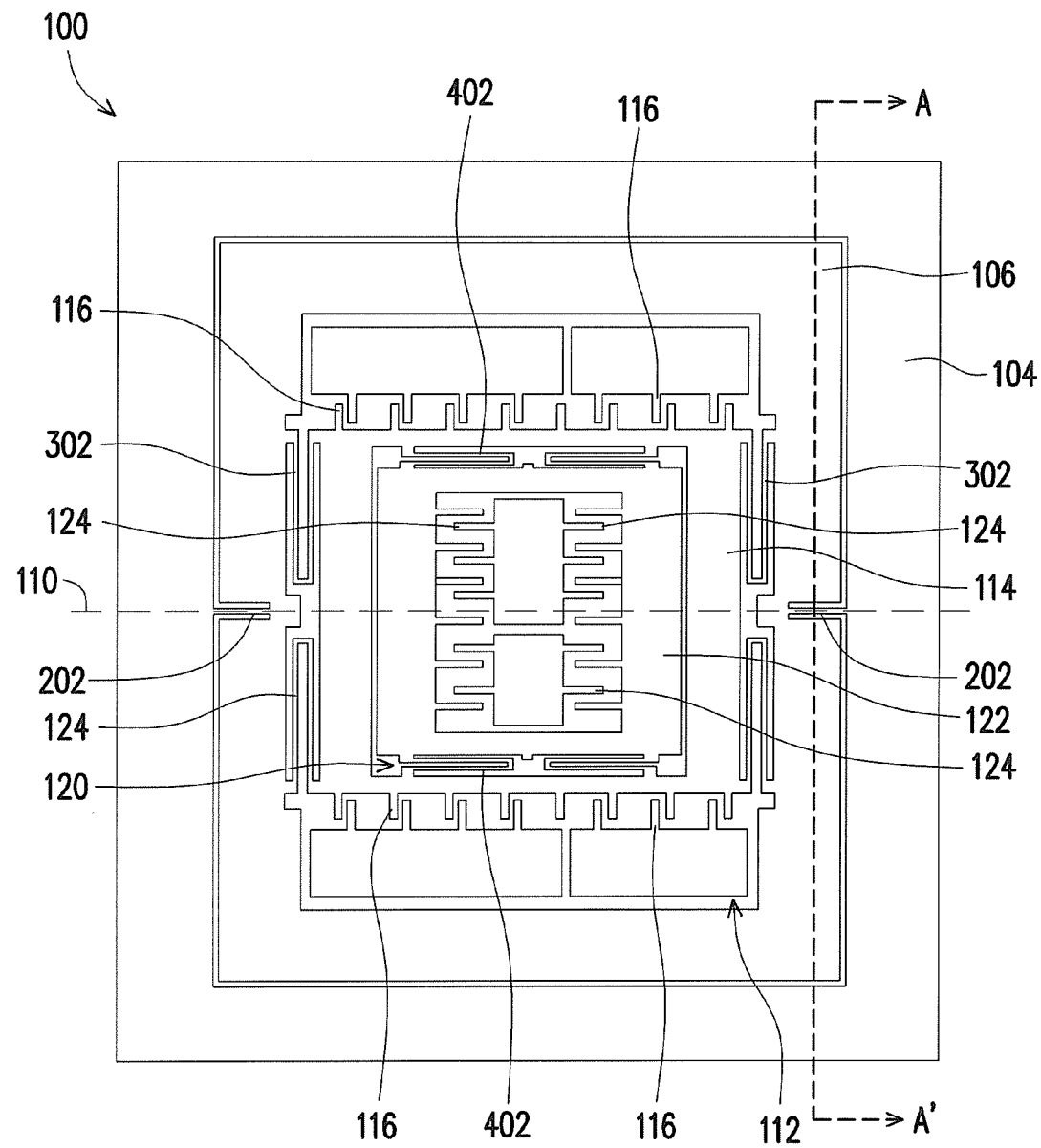
FIG. 1B is a top-view diagram of the multi-axis capacitive accelerometer of FIG. 1A.

FIG. 1A is a 3-dimensions diagram of a multi-axis capacitive accelerometer according to an embodiment of the disclosure and FIG. 1B is a top-view diagram of the multi-axis capacitive accelerometer of FIG. 1A. Referring to FIGS. 1A and 1B, a multi-axis capacitive accelerometer 100 provided by the embodiment includes a substrate 102 and an element structure layer 101. The element structure layer 101 comprises an anchor 104, a first mass 106, a second mass 114, a first independent set of springs 202, a second independent set of springs 302 and at least a comb-shaped set of capacitors 116. The anchor 104 herein is fixed on the substrate 102, the first mass 106 is asymmetrically suspended on the anchor 104 by means of the first independent set of springs 202, wherein the material of the substrate 102 can be insulation material, for example, glass or ceramic; the material of the first mass 106 can be conductor or semiconductor such as silicon.

The above-mentioned comb-shaped set of capacitors comprised of at least a first sensing capacitor plate in the element structure layer 101 and at least a fixed sensing capacitor plate fixed on the anchor 117 are staggered by each other to form a comb-shaped capacitor 116. The anchor 117 fixed on the substrate 102. Each of the different masses has an independent spring structure of their own. Since a displacement of the masses would change the capacitance of the above-mentioned comb-shaped set of capacitors in the element structure layer 101, so that the acceleration value of the multi-axis capacitive accelerometer 100 can be sensed by measuring the capacitance variation of the above-mentioned comb-shaped set of capacitors. In the embodiment, the above-mentioned comb-shaped set of capacitors includes a plurality of first comb-shaped sets of capacitors 116.

The first mass 106 has a rotation axis 110 along a first direction (X direction) and the mass of the first mass 106 is distributed asymmetrically at both sides of the rotation axis 110.

Figure 2A:
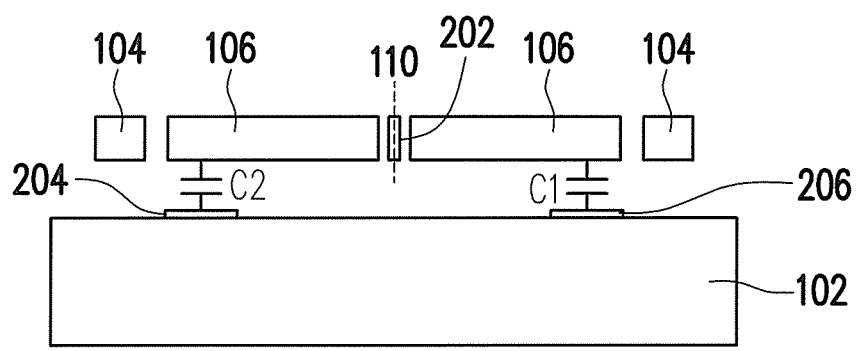
FIG. 2A is a cross-sectional diagram of the multi-axis capacitive accelerometer of FIG. 1A along line A-A' as shown in FIG. 1B, where the accelerometer is free from being exerted by a force.

FIG. 2A is a cross-sectional diagram of the multi-axis capacitive accelerometer of FIG. 1A along line A-A' as shown in FIG. 1B, where the accelerometer is free from being exerted by a force. The multi-axis capacitive accelerometer 100 further has a first independent set of springs 202 connected on the anchor 104 and connected respectively to both ends of the rotation axis 110 of the first mass 106. In the embodiment, the first independent set of springs 202 can be also implemented by using bearing beam structure, U-shaped structure, helical structure or cantilever beam structure, so that when the multi-axis capacitive accelerometer is exerted by a force in a third direction axis (Z direction), the first mass 106 rotates about the rotation axis 110. In the embodiments, the first direction axis X, the second direction axis Y and the third direction axis Z are mutually orthogonal to each other.

The multi-axis capacitive accelerometer 100 further includes a plurality of electrodes therein, for example, electrodes 204 and 206. The electrodes 204 and 206 can be disposed on the substrate 102 and at both sides of the first independent set of springs 202 so that the electrodes 204 and 206 and the first mass 106 can produce capacitance effect.

Figure 2B:
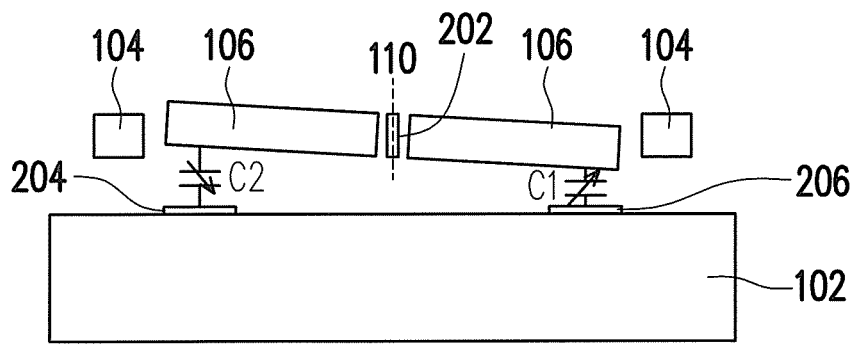
FIG. 2B is a cross-sectional diagram of the multi-axis capacitive accelerometer of FIG. 1A along line A-A' as shown in FIG. 1B, where the accelerometer is exerted by a force.

FIG. 2B is a cross-sectional diagram of the multi-axis capacitive accelerometer of FIG. 1A along line A-A' as shown in FIG. 1B. Referring to FIG. 2B, when the multi-axis capacitive accelerometer 100 is exerted by a force in a third direction axis Z, the first mass 106 rotates about a rotation axis implemented by the first independent set of springs 202. At the time, the capacitance of the electrodes 204 and 206 is changed, by which the acceleration in the in the third direction (Z direction axis) can be detected.

In some optional embodiments of the disclosure, a plurality of dimple structures can be disposed on the lower surface of the first mass 106 between the first mass 106 and the substrate 102 so that a sticking effect produced as the first mass 106 contacts the substrate 102 can be prevented.

Continuing to FIGS. 1A and 1B, the first mass 106 further has an opening 112 thereon, wherein a second mass 114, a second independent set of springs 302 and a first comb-shaped set of capacitors 116 are disposed in the opening 112. The second independent set of springs 302 enables the second mass 114 to move in the first direction (X direction) and makes the second mass 114 and the first mass 106 connected to each other. In other embodiments however, the second independent set of springs 302 can make the second mass 114 move in the second direction (Y direction) through the design of the second independent set of springs 302, which the disclosure is not limited to.

In the opening 112, the first comb-shaped set of capacitors 116 can be disposed at both sides of the second mass 114 and extend in the direction vertical to the movement direction of the second mass 114. In the embodiment, the material of the first comb-shaped set of capacitors can be conductor or semiconductor. It can be seen in FIGS. 1A and 1B, the first comb-shaped set of capacitors 116 comprised of at least a first sensing capacitor plate at the second mass 114 and at least a first fixed sensing capacitor plate on the anchor 117 are staggered by each other to form a comb-shaped capacitor 116, wherein the anchor 117 is fixed on the substrate 102. In this way, clearances are formed between the first comb-shaped set of capacitors 116 comprised of the first sensing capacitor plate at the second mass 114 and the first fixed sensing capacitor plate so as to produce a capacitance effect between the first sensing capacitor plate at the second mass 114 and the first fixed sensing capacitor plate on the anchor 117.

Figure 3:
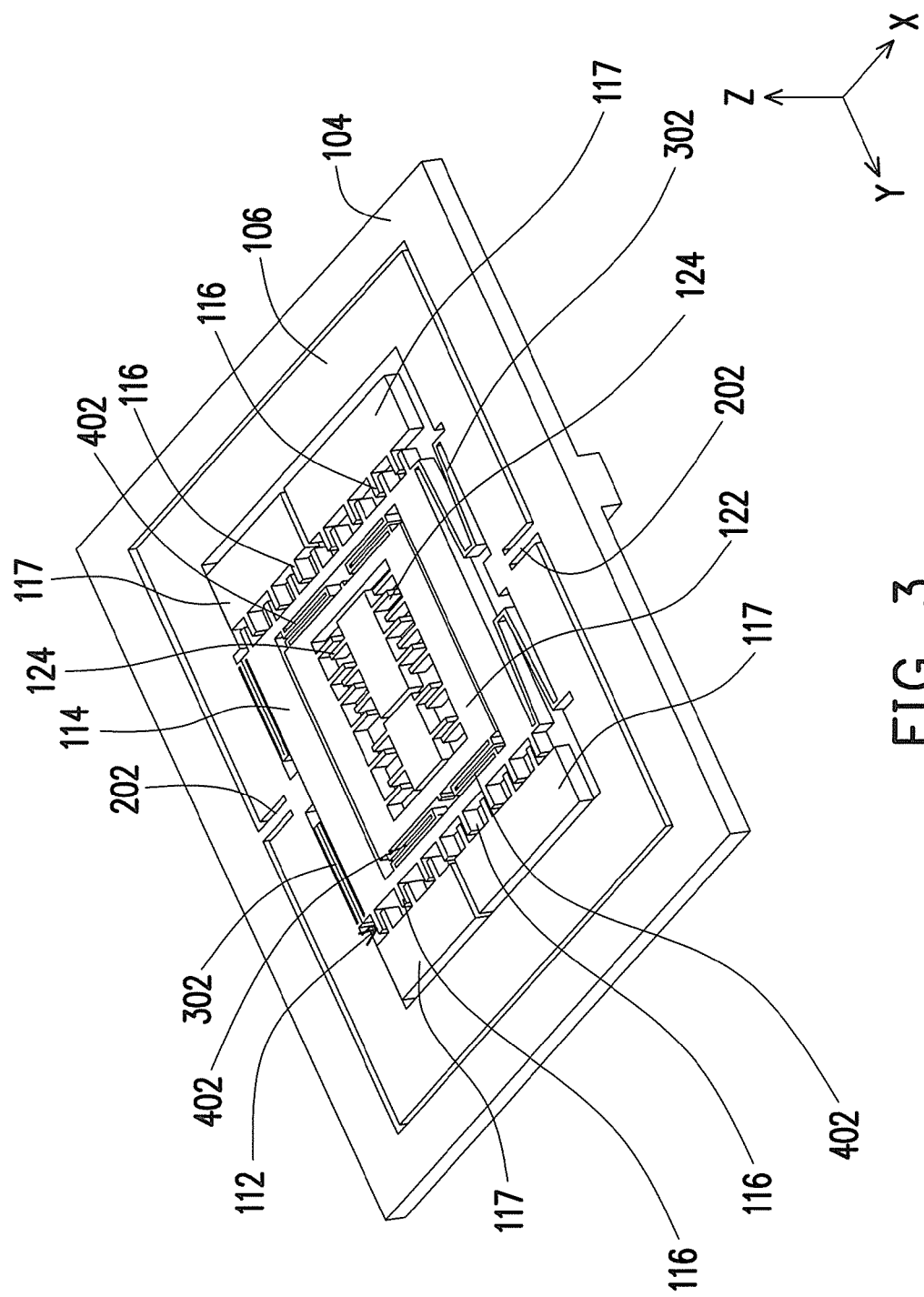
FIG. 3 is a diagram showing a multi-axis capacitive accelerometer having a change along a single axis caused by the acceleration in the fist direction.

FIG. 3 is a diagram showing a multi-axis capacitive accelerometer having a change along a single axis caused by the acceleration in the fist direction. Referring to FIG. 3, when the multi-axis capacitive accelerometer 100 is exerted by a force in space so as to have an acceleration in the first direction (X direction), the second mass 114 would move in the first direction (X direction). Meanwhile, the clearances between the first sensing capacitor plate at the second mass 114 and the first fixed sensing capacitor plate on the anchor 117 are changed, which results in a change of the capacitance of the first comb-shaped set of capacitors 116. The acceleration value of the multi-axis capacitive accelerometer 100 in the first direction (X direction) can be sensed by measuring the above-mentioned change of the capacitance of the first comb-shaped set of capacitors 116.

In some optional embodiments, the second mass 114 can further have an opening 120 thereon, wherein a third mass 122, a second comb-shaped set of capacitors 124 and a third independent set of springs 402 are disposed in the opening 120. Similarly to the above described, the third independent set of springs 402 enables the third mass 122 to move in a direction perpendicular to a plane which the movement direction of the second mass 114 is on. In the embodiment, the third mass 122 can move in the second direction (Y direction) by means of the third independent set of springs 402, and the second mass and the third mass are connected to each other through the third independent set of springs 402.

Figure 4:
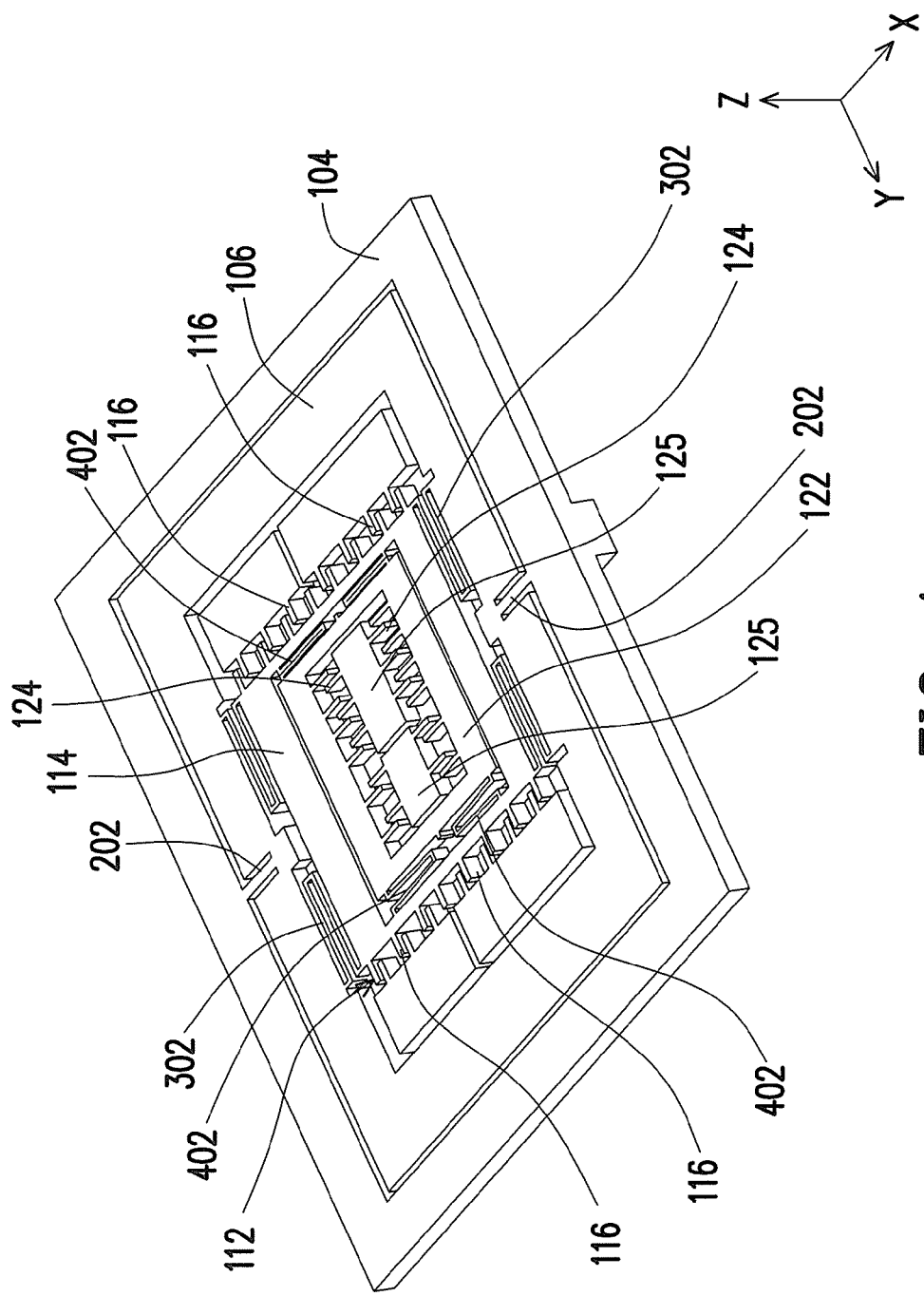
FIG. 4 is a diagram showing a multi-axis capacitive accelerometer having a change along a single axis caused by the acceleration in the second direction.

FIG. 4 is a diagram showing a multi-axis capacitive accelerometer having a change along a single axis caused by the acceleration in the second direction. Referring to FIG. 4, the second comb-shaped set of capacitors 124 comprise of at least a second sensing capacitor plate at the third mass 122 and at least a second fixed sensing capacitor plate on the anchor 125 are staggered by each other to form a second comb-shaped capacitors 124, wherein the anchor 125 is fixed on the substrate 102. In this way, when the multi-axis capacitive accelerometer 100 is exerted by a force in space so as to have an acceleration in the second direction (Y direction), the third mass 122 moves in the second direction (Y direction) and the clearances between the second sensing capacitor plate at the third mass 122 and the second fixed sensing capacitor plate are changed, which results in a change of the capacitance of the second comb-shaped set of capacitors 124. The acceleration value of the multi-axis capacitive accelerometer 100 in the second direction (Y direction) can be sensed by measuring the above-mentioned change of the capacitance of the second comb-shaped set of capacitors 124.

In addition, in some optional embodiments, a plurality of micro-hole structures can be disposed on the surface of the first mass 106 in the element structure layer, wherein the micro-hole structures are used to control the damping function.

In summary from above described, since different masses in the disclosure act by means of the corresponding sets of springs independent to each other, so that the sensed accelerations in different directions are not coupled to each other, which is beneficial to reduce the cross-axis sensitivity and have better linearity. Besides, the accelerometer structure provided by the disclosure is an integrated structure, which makes the required structure smaller.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A multi-axis capacitive accelerometer, comprising at least:
    a substrate; and
    an element structure layer, disposed on the substrate and spaced apart from the substrate by an interval; the element structure layer comprising:
        a plurality of anchors, fixed on the substrate;
        a plurality of independent sets of springs, comprising at least a first independent set of springs and a second independent set of springs;
        a first mass, asymmetrically suspended on one of the plurality of anchors by means of the first independent set of springs and having a rotation axis along a first direction, so that the mass of the first mass is asymmetrically distributed on a second direction and when the first mass is exerted by a force in a third direction, the first mass rotates about the rotation axis;
        a second mass, suspended on the first mass by means of the second independent set of springs, wherein the second mass senses the acceleration in the first direction or the second direction and moves correspondingly in the first direction or the second direction; and
        at least a comb-shaped set of capacitors, disposed at the element structure layer.

2. The multi-axis capacitive accelerometer according to claim 1, wherein the first independent set of springs is disposed on the anchor on which the first mass is suspended and connected respectively to both ends of the rotation axis of the first mass so that the first mass rotates about the rotation axis; and
    the second independent set of springs is disposed on the first mass to enable the second mass to move in one of the first direction or the second direction and to make the first mass and the second mass connected to each other.

3. The multi-axis capacitive accelerometer according to claim 1, further comprising:
    a plurality of electrodes, disposed on the substrate and at both sides of the rotation axis so that the electrodes and the first mass produce capacitance effect; and
    wherein the comb-shaped set of capacitors comprises a first comb-shaped set of capacitors disposed at the second mass, wherein the first comb-shaped set of capacitors comprised of at least a first sensing capacitor plate and at least a first fixed sensing capacitor plate together form a comb-shaped capacitor, and the first fixed sensing capacitor plate is fixed on one of the anchors.

4. The multi-axis capacitive accelerometer according to claim 1, wherein the material of the substrate is insulation material.

5. The multi-axis capacitive accelerometer according to claim 4, wherein the insulation material is glass or ceramic.

6. The multi-axis capacitive accelerometer according to claim 1, wherein the first mass has a plurality of micro-holes.

7. The multi-axis capacitive accelerometer according to claim 1, wherein a plurality of dimple structures is disposed on the lower surface of the first mass.

8. The multi-axis capacitive accelerometer according to claim 1, wherein the second mass is suspended on the first mass only by the second independent set of springs, the first mass is suspended only on the one of the plurality of anchors.

9. A multi-axis capacitive accelerometer, comprising:
    a substrate; and
    an element structure layer, disposed on the substrate and spaced apart from the substrate by an interval; the element structure layer comprising:
        a plurality of anchors, fixed on the substrate;
        a plurality of independent sets of springs, comprising at least a first independent set of springs, a second independent set of springs and a third independent set of springs;
        a first mass, asymmetrically suspended on one of the plurality of anchors by means of the first independent set of springs and having a rotation axis along a first direction, so that the mass of the first mass is asymmetrically distributed on a second direction and when the first mass is exerted by a force in a third direction, the first mass rotates about the rotation axis;
        a second mass, suspended on the first mass by means of the second independent set of springs, wherein the second mass senses the acceleration in the first direction or the second direction and moves correspondingly in the first direction or the second direction;
        at least a comb-shaped set of capacitors, disposed at the element structure layer; and
        a third mass, suspended at the second mass by means of the third independent set of springs, wherein the third mass moves in a direction perpendicular to a plane which the movement direction of the second mass is on.

10. The multi-axis capacitive accelerometer according to claim 9, wherein the first independent set of springs is disposed on the anchor on which the first mass is suspended and connected respectively to both ends of the rotation axis of the first mass so that the first mass rotates about the rotation axis;
    the second independent set of springs is connected between the first mass and the second mass so that the second mass moves in one of the first direction and the second direction; and
    the third independent set of springs is connected between the second mass and the third mass so that the third mass moves in a direction perpendicular to a plane which the movement direction of the second mass is on.

11. The multi-axis capacitive accelerometer according to claim 9, wherein the material of the substrate is insulation material.

12. The multi-axis capacitive accelerometer according to claim 11, wherein the insulation material is glass or ceramic.

13. The multi-axis capacitive accelerometer according to claim 9, further comprising a plurality of electrodes, disposed on the substrate and at both sides of the rotation axis so that the electrodes and the first mass produce capacitance effect.

14. The multi-axis capacitive accelerometer according to claim 9, wherein the comb-shaped set of capacitors comprises:
- a first comb-shaped set of capacitors, disposed at the second mass, wherein the first comb-shaped set of capacitors comprised of least a first sensing capacitor plate and at least a first fixed sensing capacitor plate together form a comb-shaped capacitor and the first fixed sensing capacitor plate is fixed on one of the anchors; and
- a second comb-shaped set of capacitors, disposed at the third mass, wherein the second comb-shaped set of capacitors comprised of at least a second sensing capacitor plate and at least a second fixed sensing capacitor plate together form another comb-shaped capacitor and the second fixed sensing capacitor plate is fixed on one of the anchors.

15. The multi-axis capacitive accelerometer according to claim 9, wherein the first mass has a plurality of micro-holes.

16. The multi-axis capacitive accelerometer according to claim 9, wherein a plurality of dimple structures is disposed on the lower surface of the first mass.

17. The multi-axis capacitive accelerometer according to claim 9, wherein the second mass is suspended on the first mass only by the second independent set of springs, the third mass is suspended on the second mass only by the third independent set of springs, the first mass is suspended only on the one of the plurality of anchors.

* * * * *